（12） United States Patent
Amrany et al.

(10) Patent No.: US 6,549,925 B1
(45) Date of Patent: Apr. 15, 2003

(54) CIRCUIT FOR COMPUTING A FAST FOURIER TRANSFORM

(75) Inventors: Daniel Amrany, Ocean Township, NJ (US); Yue-Peng Zheng, Ocean Township, NJ (US)

(73) Assignee: Globespanvirata, Inc., Red Bank, NJ (US)

( * ) Notice: Subject to any disclaimer, the term of this patent is extended or adjusted under 35 U.S.C. 154(b) by 0 days.

(21) Appl. No.: 09/311,969

(22) Filed: May 14, 1999

Related U.S. Application Data

(60) Provisional application No. 60/085,831, filed on May 18, 1998.

(51) Int. Cl.⁷ .................................................. G06F 15/00
(52) U.S. Cl. ...................................................... 708/404
(58) Field of Search ...................... 708/400, 403, 708/404, 405, 406, 407, 408, 409

(56) References Cited

U.S. PATENT DOCUMENTS

| | | | |
|---|---|---|---|
| 4,763,290 A | | 8/1988 | Cowen |
| 4,787,055 A | * | 11/1988 | Bergeon et al. ............. 708/405 |
| 4,996,661 A | * | 2/1991 | Cox et al. ................... 708/508 |
| 5,091,875 A | | 2/1992 | Wong et al. |
| 5,371,696 A | | 12/1994 | Sundararajan et al. |
| 5,430,667 A | | 7/1995 | Takano |
| 5,491,652 A | | 2/1996 | Luo et al. |
| 5,633,817 A | | 5/1997 | Verhenne et al. |
| 5,694,347 A | * | 12/1997 | Ireland ....................... 708/404 |
| 5,717,620 A | * | 2/1998 | Williams .................... 708/404 |
| 5,808,925 A | | 9/1998 | Ito et al. |

* cited by examiner

*Primary Examiner*—Chuong Dinh Ngo
(74) *Attorney, Agent, or Firm*—Thomas, Kayden, Horstemeyer & Risley

(57) ABSTRACT

The present invention is generally directed to a processing circuit for computing a fast Fourier transform (FFT). The present invention reflects the recognition that excessive reads to and writes from memory consume excessive amounts of power. Accordingly, the circuit of the present is specifically designed to minimize the number of reads and writes to memory. In addition, the circuit is designed so that processing parallelism may be achieved in order to reduce the total number of clock cycles required to compute a FFT. In accordance with one aspect of the invention, the processing circuit includes a data memory for storing data values, and a separate coefficient memory for storing coefficient (or twiddle) values. The circuit further includes a multiplier configured to multiply values received from the coefficient memory and another value retrieved from some other location. The circuit further includes a first adder configured to add a value output from the multiplier with a value retrieved from another location. The circuit further includes a second adder configured to add a value retrieved from the data memory with a value retrieved from another location. Finally, the circuit includes write-back data path disposed between the second adder and the data memory. The write-back data path is configured to write data output from the second adder to the data memory, to a location where a data value was previously retrieved.

2 Claims, 6 Drawing Sheets

| Cycle | Memory | DMAC | ALU | FIFOr[1:0] | FIFOi[1:0] |
|---|---|---|---|---|---|
| 1 | Rd(B0, W0) | | | | |
| 2 | | ACC=B0r*W0r | | | |
| 3 | | ACC=ACC-B0i*W0i | | | |
| 4 | Rd(A0) | ACC=B0r*W0i, DACC=ACC | | | |
| 5 | Rd(B1, W1) | ACC=ACC+B0i*W0r | Reg=A0r-DACC | | |
| 6 | | ACC=B1r*W1r, DACC=ACC | Reg=A0r+DACC | FIFOr=R0(D0r) | |
| 7 | | ACC=ACC-B1i*W1i | Reg=A0i-DACC | FIFOr=Reg (C0r) | |
| 8 | Rd(A1) | ACC=B1r*W1i,DACC=ACC | Reg=A0i+DACC | | FIFOi=R0(D0i) |
| 9 | Rd(B2, W2) | ACC=ACC+B1i*W1r | Reg=A1r-DACC | FIFOr=R0(D1r) | FIFOi=R0(C0i) |
| 10 | Wr(D0) | AC=B2r*W2r, DACC=ACC | Reg=A1r+DACC | FIFOr=R0(C1r) | |
| 11 | Wr(C0) | ACC=ACC-B2i*W2i | Reg=A1i-DACC | | |
| 12 | Rd(A2) | ACC=B2r*W2i, DACC=ACC | Reg=A1i+DACC | | FIFOi=Reg (D1i) |
| 13 | Rd(b3, W3) | ACC=ACC+B1i*W2i | Reg=A2r-DACC | | FIFOi=Reg (C1i) |
| 14 | Wr(D1) | ACC=B3r*W3r, DACC=ACC | Reg=A2r+DACC | FIFOr=Reg (D2r) | |
| 15 | Wr(C1) | ACC=ACC-B3i*W3i | Reg=A2i-DACC | FIFOr=Reg (C2r) | |
| 16 | Rd(A3) | ACC=B3r*W3i, DACC=ACC | Reg=A2i+DACC | | FIFOi=Reg (D1i) |
| 17 | Rd(B4, W4) | ACC=ACC+B3i*W3r | Reg=A3r-DACC | | FIFOi=R0(C1i) |
| 18 | Wr(D2) | ACC=B4r*W4r, DACC=ACC | Reg=A3r+DACC | FIFOr=Reg (D3r) | |

FIG. 6

CIRCUIT FOR COMPUTING A FAST FOURIER TRANSFORM

CROSS-REFERENCE TO RELATED APPLICATION

The present application claims the benefit of U.S. Provisional Patent Application Ser. No. 60/085,831, filed May 18, 1998, and entitled "FFT Implementation in the Frequency Domain."

BACKGROUND OF INVENTION

1. Field of the Invention

The present invention generally relates to digital signal processors, and more particularly to a processing circuit for computing a fast Fourier transform (FFT) in a digital signal processor.

2. Discussion of the Related Art

As is known, digital signal processors (DSPs) are used in a wide variety of practical applications. Although circuit architectures may vary from chip to chip, DSPs are generally characterized by a multiplier component. As is known, multipliers perform the multiplication operation at an extremely high rate of speed (often within a single clock cycle). In comparison, a typically microprocessor architecture, which contains shifters adders and accumulators, performs a number of shift, add, and accumulate operations to carry out a multiplication operation. This manner of performing a single multiplication operation requires a relatively large number of clock cycles. As a result, arithmetic computations requiring many multiplication operations are preferably performed with a DSP.

As merely one example, DSP chips are used in electronic communications, and virtually all modems include an on-board DSP chip. As is known by those skilled in the communications art, the coding, filtering, error-correction, and other processes associated with electronic communications all demand relatively extensive mathematical computations. In order to achieve the desired speed for communications—and the faster, the better—DSP chips are used to perform this processing.

The FFTs are based on the discrete Fourier transforms. The algorithms are fast because they reuse the same roots of unity many times and thus minimize the number of multiplications. This reuse of the roots of unity reduces the complexity of the operation to N log N. Typical FFT algorithms achieve the decrease in complexity over the discrete Fourier transform algorithm by using these roots of unity and storing the intermediate values in global memory. The stored values are retrieved rather than explicitly using a multiplication to calculate them.

In this regard, the FFT processor may generally be characterized as a digital processor which repetitively performs the basic computations:

$$AW+B; AW-B,$$

where A and B are complex digital words, each initially associated with a different one of N digital samples, generally of the radar video signal the frequency spectrum of which is to be analyzed, and W is a complex digital word which serves as a weighting coefficient (also known as a twiddle factor). The above computations would be performed by processing such digital words in parallel form, as mentioned above, using a complex multiplier to perform the AW portion of the calculation, a storage means for storing such portion of the calculation, and a complex parallel adder and subtractor for adding and subtracting the stored portion of the calculation to and from, respectively, the B portion of the calculation.

Unfortunately, such algorithms often do not work well for low energy consumption implementations due to the global nature of the shared memory required for storage and lookup of the intermediate results. Current technology employs two approaches for architecting FFTs for high performance or low energy consumption. A complex switching network, called a butterfly network, is employed to forward results between parallel functional units in a pipelined manner. One obstacle to low energy consumption and higher performance relates to the memory architectures used to store and forward intermediate results. Global memories are notoriously slow and heavily loaded due to their shared nature. More significantly, however, the large number of intermediate reads and writes that are made to memory devices leads to increased power consumption.

Accordingly, there is a desire to provide an improved architecture for computing FFTs that overcomes these and other related shortcomings of the prior art.

SUMMARY OF INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a processing circuit for computing a FFT. The present invention reflects the recognition that excessive reads to and writes from memory consume excessive amounts of power. Accordingly, the circuit of the present is specifically designed to minimize the number of reads and writes to memory. In addition, the circuit is designed so that processing parallelism may be achieved in order to reduce the total number of clock cycles required to compute a FFT.

In accordance with one aspect of the invention, the processing circuit includes a data memory for storing data values, and a separate coefficient memory for storing coefficient (or twiddle) values. The circuit further includes a multiplier configured to multiply values received from the coefficient memory and another value retrieved from some other location. The circuit further includes a first adder configured to add a value output from the multiplier with a value retrieved from another location. The circuit further includes a second adder configured to add a value retrieved from the data memory with a value retrieved from another location. Finally, the circuit includes write-back data path disposed between the second adder and the data memory. The write-back data path is configured to write data output from the second adder to the data memory, to a location where a data value was previously retrieved.

In accordance with a preferred embodiment of the invention, the circuit includes a plurality of multiplexers that are configured to controllably route data from one location to another. In this regard, a first multiplexer is disposed to retrieve a value to output to the second input of the first adder, wherein the retrieved value may be retrieved from the data memory, or from the output of the first adder. In similar fashion, a second multiplexer is disposed to retrieve a value to output to the second input of the second adder, wherein the retrieved value may be retrieved from various locations to route to the second adder. Specifically, this second multiplexer may route data from the data memory, the output of the first adder, or from the output of the second adder. Additional multiplexers may be provided to retrieve both real and imaginary components of data values and coefficient values to controllably route either the real portion or the imaginary portion into various arithmetic units of the circuit. In this way, complex numbers may be controllably manipulated, multiplied, or added to effectively carry out the computation of the present invention.

Once a given data value has been computed for a given stage in the FFT computation, the computed data value is written back to the data memory of the processing circuit. In this regard, a write-back data path is provided to route the data from the output of the second adder back to the data memory. Preferably, at least one FIFO is disposed within this write-back data path to facilitate parallelism in this process. Further, an address controller is provided which controls the addressing of both the data memory and coefficient memory for both read and write operations. Thus, data written back to the data memory by way of the write-back data path is synchronized by the address controller so that it is written at times when data values are not being read out from the data memory. Therefore, what is provided is a highly efficient circuit for processing FFT computations.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 6 is a table illustrating the operation of the circuit of FIG. 3 during eighteen clock cycles of a computation of a FFT, in accordance with the butterfly chart of FIG. 4.

DETAILED DESCRIPTION OF THE PREFERRED EMBODIMENT

Figure 1A:
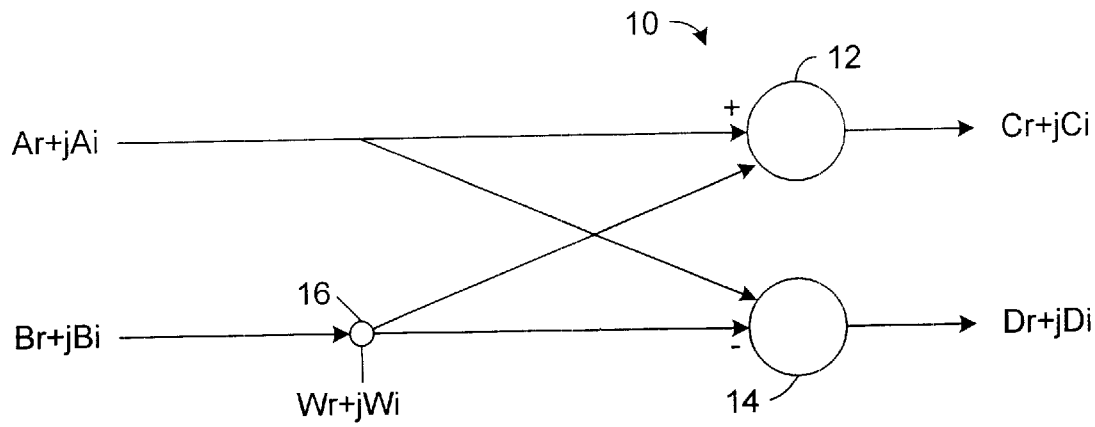
FIG. 1A is a diagram that illustrates a single complex butterfly operation.

Having summarized the invention above, reference will now be made in detail to the description of the invention as illustrated in the drawings. While the invention will be described in connection with these drawings, there is no intent to limit the invention to the embodiment or embodiments disclosed therein. On the contrary, the intent is to cover all alternatives, modifications and equivalents included within the spirit and scope of the invention as defined by the appended claims.

Figure 1B:
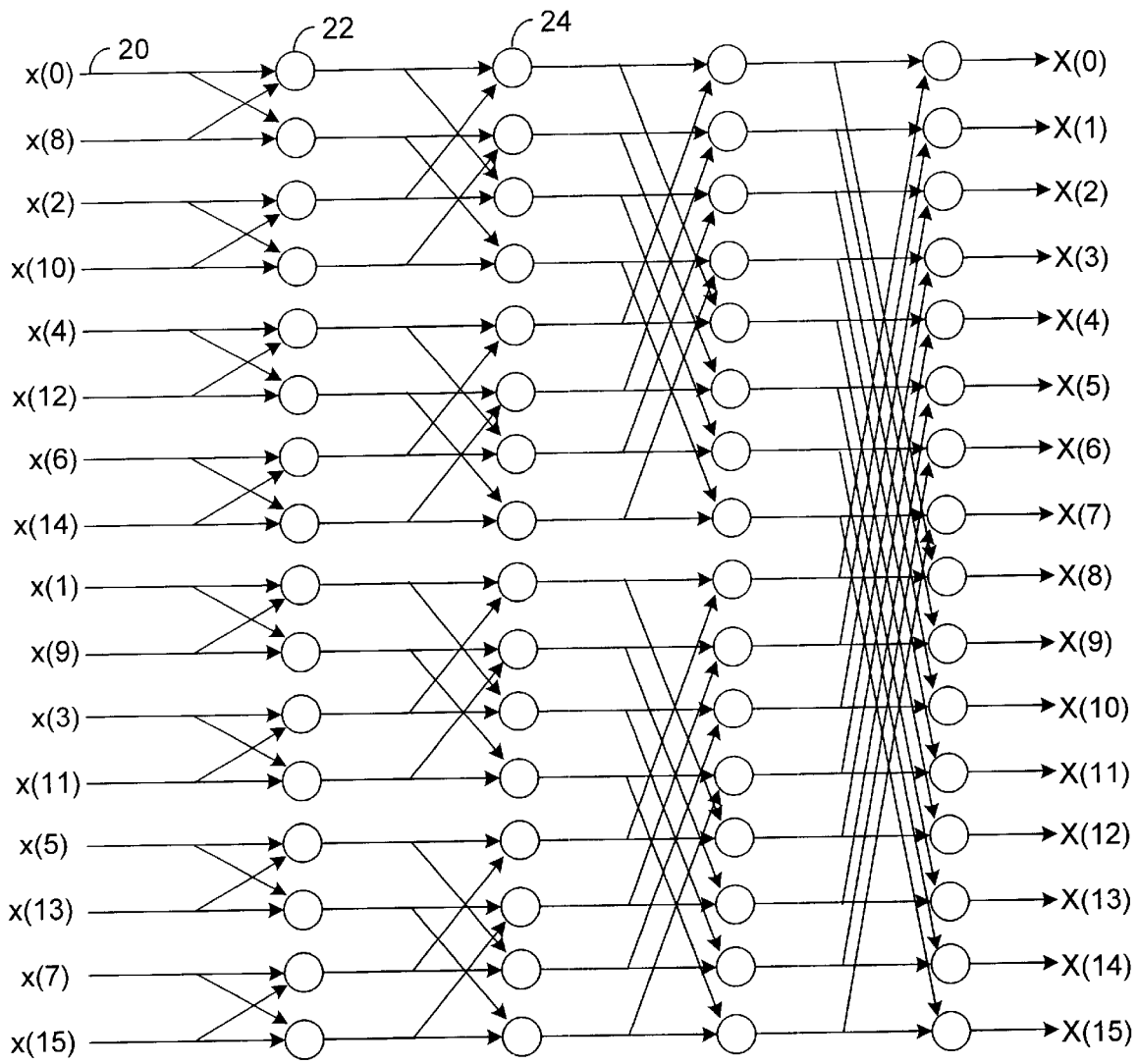
FIG. 1B is a diagram that illustrates a plurality of complex butterfly operations that may be executed in computing a sixteen point FFT.

Turning now to the drawings, reference is now made to FIG. 1A, which illustrates a single complex butterfly 10, of a type that is well known in the processing of an FFT. As is well known, the complex butterfly operation receives two complex input data values A and B, where $A=A_r+jA_i$ and $B=B_r+jB_i$. The complex butterfly operation results in two outputs C and D, where $C=C_r+jC_i$ and $D=D_r+jD_i$. The operation itself includes multiplying B by a FFT coefficient value W, where $W=W_r+jW_i$. As previously mentioned, this coefficient value is often referred to as a twiddle factor. The point 16 represents a multiplier which computes the product of B and W. This product is added to A to generate the first output C. Similarly, the product of B and W is subtracted from A to generate the output D. This complex butterfly operation is performed using predetermined coefficient values in a predetermined fashion, to generate output data values that represent the FFT of the input data values. FIG. 1B illustrates the layout of a number of complex butterfly operations in performing a sixteen point FFT As is shown, a sixteen point FFT includes four stages of complex butterfly computations. As the computation of FFTs in accordance with the butterfly chart of FIG. 1B is well known, details regarding its computation need not be described herein.

Instead, the present invention is directed to a novel method and apparatus for computing a FFT in accordance with the butterfly operation of FIG. 1A, such that the overall computation consumes less power than the computation as performed in the prior art. As will be appreciated from the discussion that follows, one aspect of the present invention relates to the processing circuit for carrying out the complex mathematical operations, while one aspect of the present invention relates to a method for computing the FFT as well as an associated addressing circuit that closely controls the memory reads and writes in carrying out the complex FFT computations. In this regard, one aspect of the present invention is to perform the complex FFT computation while minimizing the number of reads and writes to and from memory. By minimizing the number of reads and writes to memory, the system and method realize a solution that requires less power consumption.

Figure 2:
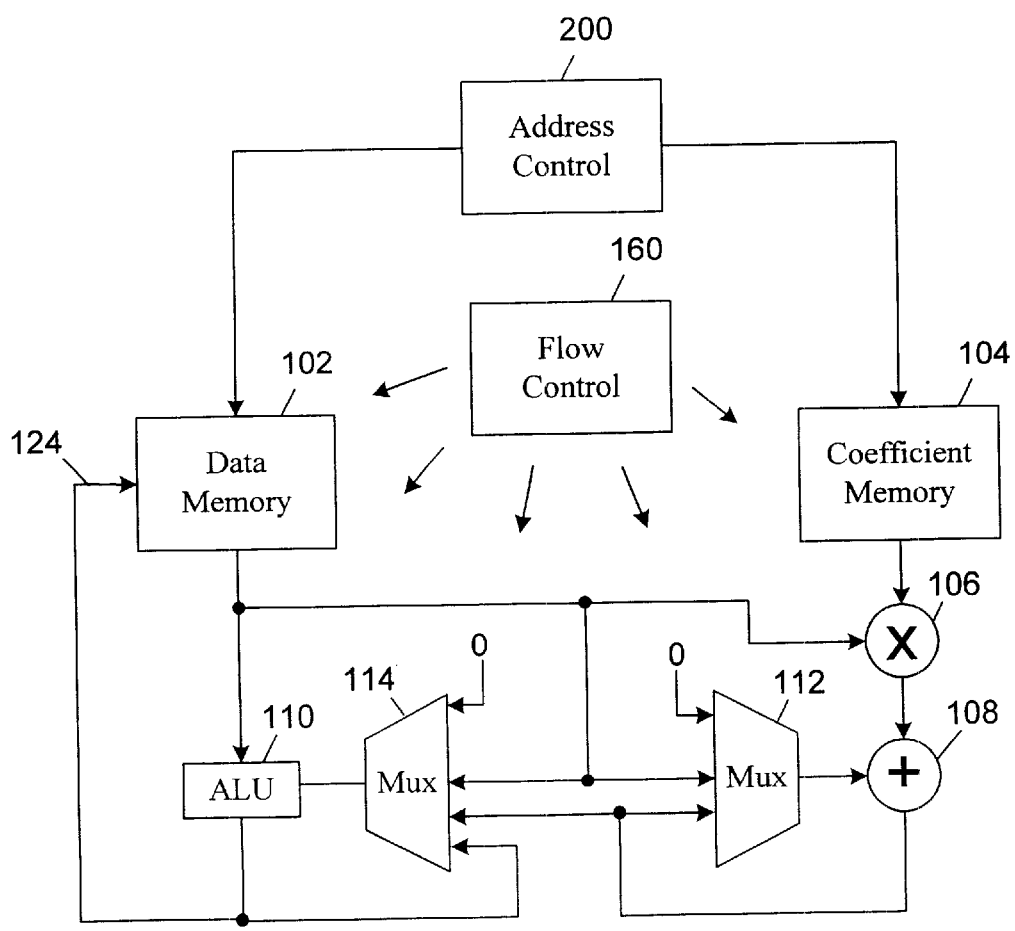
FIG. 2 is a block diagram illustrating a processing circuit constructed in accordance with one embodiment of the present invention.

Reference is now made to FIG. 2, which is a block diagram that illustrates certain fundamental components of a circuit 100 for processing the FFT computation. The circuit 100 includes two memory devices 102 and 104, which comprise a data memory 102 for storing the input data values, the intermediate computed values, as well as the output values of the FFT. In contrast, the coefficient memory 104 maintains the predetermined coefficient (or twiddle) values that are used in connection with the various complex butterfly operations. As can be verified by the computations involved in carrying out a single complex butterfly operation, each such complex butterfly operation requires four multiply operations and eight addition and subtractaction operations. Therefore, to minimize the number of clock cycles, and thereby maximize the efficiency of the processing operations, the processing circuit 100 includes a single multiplier 106, an adder 108, and an arithmetic logic unit (ALU) 110. As is readily observed from the complex butterfly structure, the coefficient W is multiplied by the second input B. Therefore, a path 116 is provided between the coefficient memory 104 and the multiplier 106. Coefficient values may be routed along this path 116 when directed to the multiplier 106 for computation. Another path 120 is provided between the data memory 102 and the multiplier 106. The input value B, which is multiplied by the coefficient value W, may be routed across this path 120. A adder 108 is disposed in communication with the output of the multiplier 106, to receive its output and add to it a second input. This input may be routed from one of several locations, including the data memory 102 as well as the output of the adder 108 itself. To facilitate such data routing, a multiplexer 112 may be disposed in communication with the second input of adder 108.

Similarly, a second multiplexer 114 may be disposed in communication with an input for the ALU 110. This ALU 110 may have an input disposed in direct communication with the data memory 102 for receiving values directly therefrom. This value, retrieved from the data memory (the value of A for the complex butterfly operation), may be added to a second input that may be obtained from one of several locations. Specifically, the multiplexer 114 may controllably direct data from the data memory 102 (across data path 120), from the output of the adder 108, or from the output of the ALU 110 to the second input of the ALU 110. In addition, each multiplexer 112 and 114 may have an input that is grounded (or otherwise carries a value of zero), so that a zero value may be added to the first input of adder 108 and ALU 110.

In accordance with one feature of the present invention, a write-back data path 124 is provided between the output of the ALU 110 and the data memory 102. As intermediate data values of the complex FFT are computed, they are written back into the appropriate location of the data memory 102. By way of example, and again referring briefly to FIG. 1B, the first data value 20 (X(0)) may be stored at a predetermined location within the data memory 102. The first intermediate value 22 that is computed in the complex butterfly processing of the FFT will preferably be stored in the same address location of the data memory 102, thereby overwriting the value of X(0). Likewise, intermediate value 24 will overwrite the intermediate value 22, as they will be stored at the same location within the data memory 102. Thus, the data memory 102 may be a small sixteen word memory for computing a sixteen point FFT. In this regard, a complex word may comprise two scalar words bytes, wherein a first scalar word byte stores the real component for each data value, and a second scalar word byte may store the imaginary component for each data value.

As should be appreciated by persons of ordinary skill in the art, various modifications and variation may be made to the circuitry described herein. For example, the processing circuit has been described as including a multiplier 106, an adder 108, and an ALU 110. In this regard, in a preferred embodiment, adder 108 is implemented as a true adder, and is not capable of performing subtraction operations. The adder 108 has been implemented in this way for purposes of circuit simplicity. The ALU 110, however, has been configured and implemented in a manner that allows it to perform subtraction operations, as well as true addition operations. Thus, it will be appreciated that an ALU could be readily substituted for the adder 108.

It should be further appreciated from the discussion herein that the circuit computes the equation: ACC=ACC−W*B, where ACC is the value held by the accumulator 130 (see FIG. 3). Therefore, the circuit is configured to subtract the product of W*B from the accumulator output. One way that this could be implemented is by substituting an ALU in place of the adder 108. In the preferred embodiment, however, the multiplier 106 is configured so that is may invert in input. Thus, for example, the W input may be inverted, so that the product W*B results in a negative value. Accordingly, the adder 108 may perform a true addition of this negative product with the previous value of the accumulator 130 (See FIG. 3) to compute the ACC=ACC−W*B equation.

Figure 3:
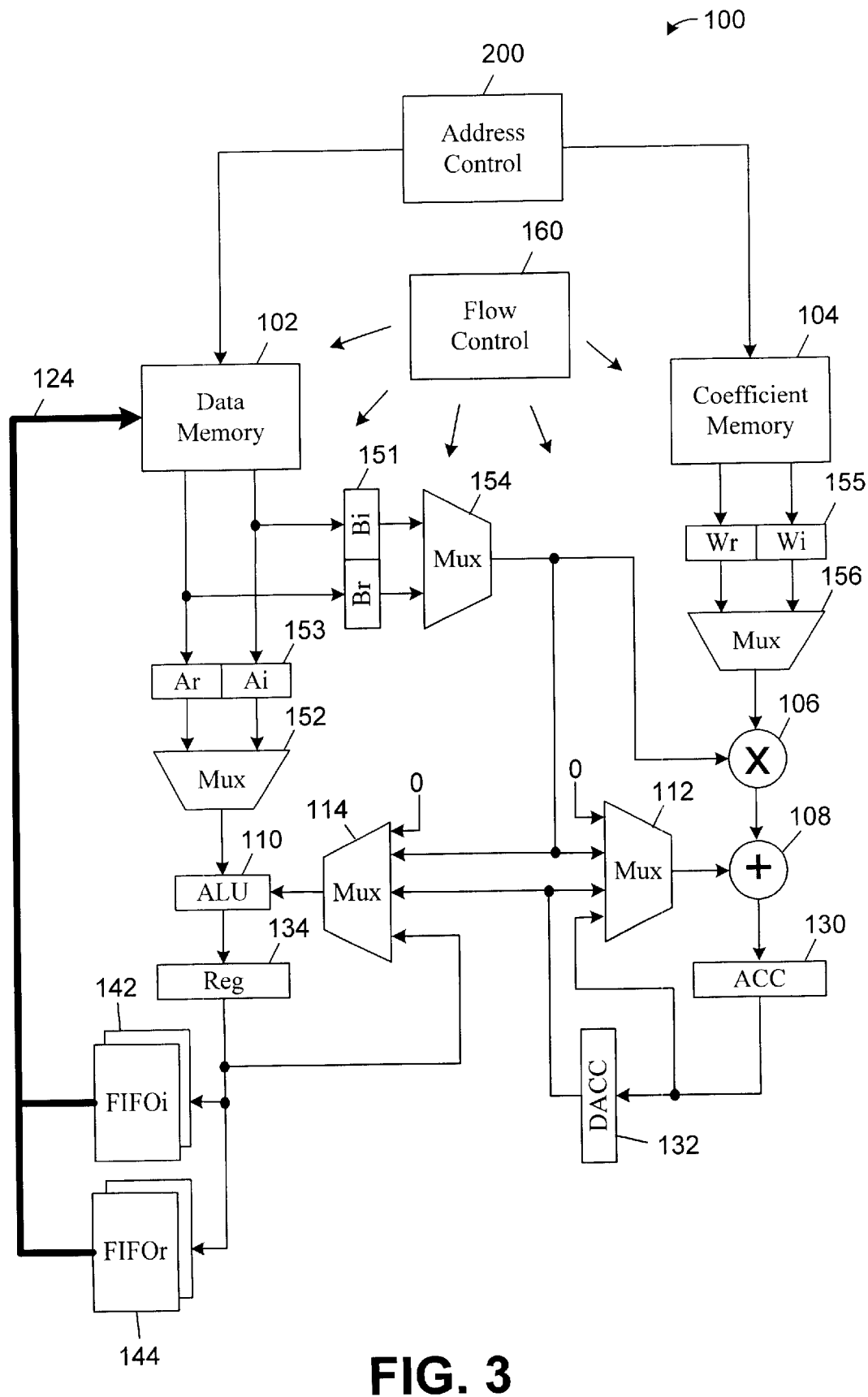
FIG. 3 is a block diagram similar to the diagram of FIG. 2, but illustrating further circuit detail, in accordance with one embodiment of the present invention.

Reference is now made to FIG. 3, which shows the processing circuit of the preferred embodiment, similar to FIG. 2, but illustrating additional detail. Therefore, components which have already been discussed, need not be discussed again. What is illustrated, however, are registers, additional multiplexers, and FIFOs that are used in the write-back data path 124. In the preferred embodiment of the present invention, an accumulator register 130 is provided to receive the output of adder 108. As will be appreciated, the adder 108 is a circuit device that operates asynchronously. Therefore, the accumulator 130 is a register device that may be clocked to retrieve and hold the value of the adder 108. A second accumulator 132, or delayed accumulator, may be provided to register the output of the first accumulator 130. As is illustrated, the output of the delayed accumulator 132 is directed to both multiplexers 112 and 114. Another register 134 is provided to register the output of the ALU 110.

Additional multiplexers include a third multiplexer 156, a fourth multiplexer 154, and a fifth multiplexer 152. Each of these multiplexers are illustrated as a two input, one output multiplexer, and are each configured in the same fashion. Namely, to controllably direct the real versus imaginary components of data/coefficient values for the complex arithmetic operations to be carried out. More specifically, the third multiplexer 156 is disposed to receive data read from the coefficient memory 104. The bus that is output from the coefficient memory 104 is illustrated as being input to a register 155, which illustrates both the real and imaginary components of the coefficient value W. In this regard, registers 151, 153, and 155 may be utilized to clock values read from memories 102 and 104. It will be appreciated that, in implementation, the coefficient memory may be implemented as a 32 bit memory. If so, then 16 data lines will be directed to one input of a bank of multiplexers 156, while the other 16 lines will be directed to the other input of the bank of multiplexers 156. It should be appreciated that sixteen of the data lines will carry the real component of the coefficient value (Wr) while the other sixteen lines will carry the imaginary portion (Wi) of the coefficient value W. Alternatively, the coefficient memory 104 could be implemented as a sixteen bit memory, where two sets of eight lines are directed from the output of the memory 104 to a bank of multiplexers 156. What is significant for purposes of the preferred embodiment is that the multiplexer 156 may controllably direct either the real portion or the imaginary portion of the coefficient value to the multiplier 106. In this regard, it is well known that the coefficient W is multiplied by the data value B in accordance with the following equation:

$$B*W=(Br+jBi)*(Wr+jWi)=Br*Wr-Bi*Wi+j*(Br*Wi+Bi*Wr)$$

Thus, as each of the multiplication operations from the above equation are carried out, the multiplexer 156 can controllably route the real or imaginary components of the coefficient W from the coefficient memory 104 to the multiplier 106. In the same way, multiplexers 152 and 154 are configured to controllably direct the real and imaginary components of the data values A and B to the multiplier 106, multiplexer 112, multiplexer 114, and ALU 110, as illustrated.

FIFOs 142 and 144 are also provided along the write-back data path 124. Specifically, FIFO 142 is configured as a buffer memory between the register 134 and the data path 124, for imaginary components of interim data values that are to be written back to the data memory 102. Similarly, FIFO 144 provides a buffer for interim data values that are to be written from register 134 to the data memory 102. As will be further described below, the address controller 200 controls the addresses of the data memory 102, as well as the coefficient memory 104. Significantly, interim data values from the data memory 102, as they are computed, are written back over previously existing data values within the data memory 102. The address controller controls the memory as data is both read and written from and two the data memory 102. FIFOs 142 and 144 provide temporary storage for data values that prevents contention as data may be read from one address of the data memory 102, before it is written from the FIFOs 142 and 144 to another location in the data memory 102. As will be further appreciated from the discussion that follows, the FIFOs also increase the efficiency of the circuitry by improving its parallelism.

Additional flow control circuitry 160 may also be provided to provide various control signals required for proper operation of the circuit 100. For example, select lines that control the multiplexers 112, 114, 152, 154, and 156 must be generated and coordinated in proper timing and sequence to control the routing of data to and from various locations within the circuitry. As will be appreciated by persons skilled in the art, additional control signals may need to be generated, but such detail need not be described herein in order to gain an understanding of the present invention.

In order to gain a better understanding of the operation and flow of the circuit 100 illustrated in connection with FIG. 3, reference is made to the table of FIG. 6. The table of FIG. 6 illustrates a sequence comprising 18 clock cycles in the computation of a complex butterfly operation. In a first clock cycle, the data value B0 is read from the data memory 102, while the coefficient W0 is read from coefficient memory 104. Coincident with the next clock cycle, the accumulator 130 receives the value of B0r×W0r. This result is obtained or achieved by the multiplier 106 multiplying the real portion of the coefficient W0 with the real portion of the data value B, and directing that output to adder 108. Adder 108 then adds this value with a value of zero. As illustrated, one input to the multiplexer 112 may comprise a zero value. As will be appreciated, the multiplier 106 and adder 108 operate asynchronously, and may compute this value in much less than a clock cycle. Therefore, upon the second clock cycle, the accumulator 130 may be clocked to retrieve this interim data value. Thereafter, on a third clock cycle, the accumulator 130 clocks in the value of its previous value minus the product of B0i×W0i. As described above, this computation is performed by multiplexers 154 and 156 directing the imaginary components of data value B and coefficient W to the multiplier 106. The output of multiplier 106 is directed to the first input of adder 108. In addition, the multiplexer 112 may be controlled to direct the output the of accumulator 130 to the second input of the adder 108. This summation may then be clocked in to the accumulator 130.

At a fourth clock cycle, data value A0 is read from the data memory into register 153. During the same clock cycle, the accumulator registers the product of B0r×W0i, and the delayed accumulator 132 registers the previous value held by the accumulator 130. In a fifth clock cycle, the data value B1 is read from the data memory 102 into register 151, while the coefficient W1 is read from the coefficient memory 104 into register 155. Coincident with the same clock cycle, the accumulator 130 registers the value of the previous accumulator value added to the product of B0i×W0r. During the same clock cycle, register 134 clocks the summation of data value A0r (real component) minus the value stored in the delayed accumulator 132. It will be appreciated that the real component of the data value 80 is directed by the multiplexer 152 to the ALU 110, which may be controlled to subtract the value of the delayed accumulator 132, which is routed through multiplexer 114 to the ALU 110.

In a sixth clock cycle, the accumulator 130 registers the value of B1r×W1r. During the same clock cycle, the delayed accumulator 132 registers the value previously stored on the accumulator 130. Also during this sixth clock cycle, register 134 receives the value of A0r plus the value stored on the delayed accumulator. Further still, during this sixth clock cycle, the real FIFO 144 receives the value previously stored on register 134. It should be appreciated that this interim value is equal to D0r (as illustrated in FIG. 1A).

During the seventh clock cycle, the accumulator 130 registers the value of the previous accumulator value minus B1i×W1i. Also, register 134 registers the value of A0i minus the value previously stored on the delayed accumulator 132. Also, the real FIFO 144 is written with the value previously stored on register 134, which corresponds to C0r (see FIG. 1A).

In addition to mathematical computations, it is observed in clock cycles 8 and 9 that the imaginary FIFO 142 is written with values D0i and C0i (again refer to FIG. 1A). Thus, after the ninth clock cycle, the two deep real FIFO includes D0r and C0r, and the two deep imaginary FIFO 142 includes the value of D0i and C0i. As is further illustrated in Table 1, during the tenth clock cycle the value of D0 is written to the data memory 102, and in the eleventh clock cycle the value of C0 is written to the data memory 102. It should be appreciated that these write operations place both the real and imaginary components of the data values onto the write-back path 124. Again, and as previously mentioned, if the data memory 102 is a thirty-two bit memory, then the real FIFO 144 and the imaginary FIFO 142 will each be sixteen bit FIFOs, each of which may be configured to be in communication with half of the write-back path 124.

Figure 4:
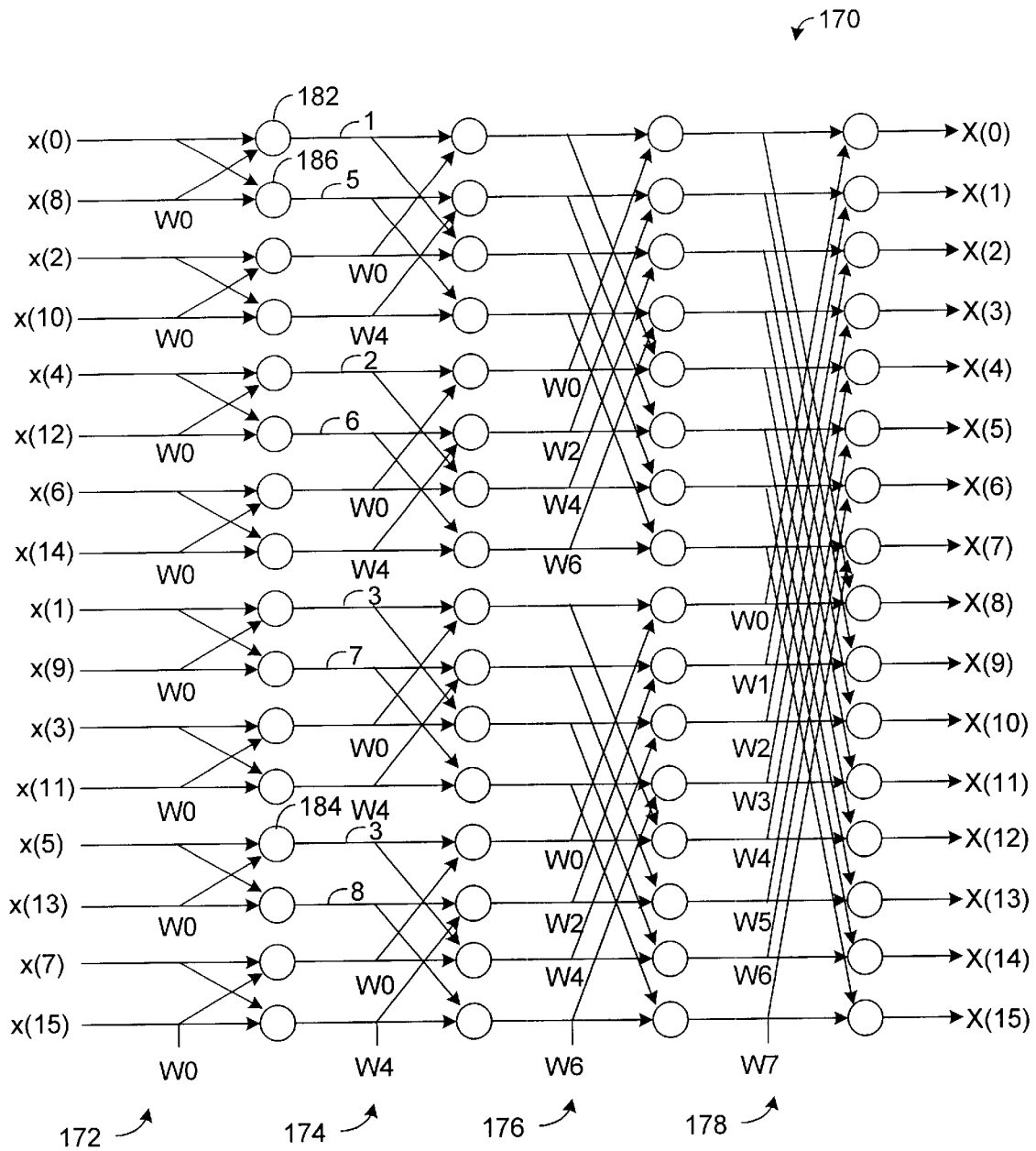
FIG. 4 is a butterfly diagram illustrating the computation of a FFT, similar to that shown in FIG. 1B, but further illustrating the sequencing of the computation as carried out in accordance with one embodiment of the present invention.

The arithmetic operations illustrated in Table 1, as partially described above, clearly illustrate the manner in which data flow within the circuit 100 of FIG. 3 is controlled in order to efficiently compute a complex FFT in accordance with the butterfly chart illustrated in FIG. 1B. In accordance with one aspect of the present invention, however, this complex FFT computation is carried out by closely controlling the order in which the butterfly operations are computed, so that the number of memory accesses is minimized. By minimizing the number of memory accesses, power dissipation is also minimized. To better illustrate this point, reference is made briefly to FIG. 4, which illustrates the butterfly chart for a complex FFT, similar to that illustrated in FIG. 1B. In addition, however, FIG. 4 also illustrates certain coefficient values that are used in the computation process; specifically, coefficient values W0 through W7.

As illustrated, the sixteen point FFT is computed in four stages 172, 174, 176, and 178. During the first stage 172 of computations, only coefficient value W0 is used. During the second stage, however, coefficient values W0 and W4 are used. In the third stage 176, coefficient values W0, W2, W4, and W6 are used. Finally, in the fourth stage, all coefficient values W0 through W7 are used. More specifically, in the first stage 172, coefficient value W0 is used eight times. In the second stage of computation 174, coefficient value W0 is used four times, while coefficient value W4 is used four times. In the third stage of computation, the coefficient values W0, W2, W4, and W6 are each used twice. Finally, and a last stage of computation the coefficient values W0 through W7 are each used once.

In accordance with the preferred embodiment, the complex butterfly operations of the first stage 172 and the last stage 178 may be computed in the manner in which they are typically computed: that is, from top to bottom. However, in order to realize reduced memory accesses in accordance with one aspect of the present invention, the second and third stages are computed in a different fashion. Specifically, the second stage of the FFT computation is computed by computing those complex butterfly operations that each use coefficient value W0. Then, once each of those four complex butterflies have been computed, the system proceeds by computing the remaining four complex butterflies that use coefficient value W4. Likewise, in the third stage of computation the invention computes the two complex butterfly operation and each use coefficient W0 first, then computes each of the two complex butterflies that utilize coefficient value W2, then computes each of the two complex butterfly operations that utilize coefficient value W4, then finally computes each of the two complex butterfly operations that utilize coefficient W6. It will be appreciated that if the system computes the complex butterfly operations of the second stage 174 in order from top to bottom it will have to perform an excessive number of reads from the coefficient memory 104, by alternatingly retrieving values W0 and W4, four times each, rather than just retrieving each value once. Similar duplicative reads from coefficient memory 104 would be made in the third stage 176, without the benefit of the inventive method.

Although described above in connection with the computation of a sixteen point FFT, it will be appreciated that the processing circuit 100 will operate equally well with a thirty two point FFT, a sixty four point FF, a two-hundred fifty six point FFT, a five hundred twelve point FFT, as well as other size FFTs as well.

Figure 5:
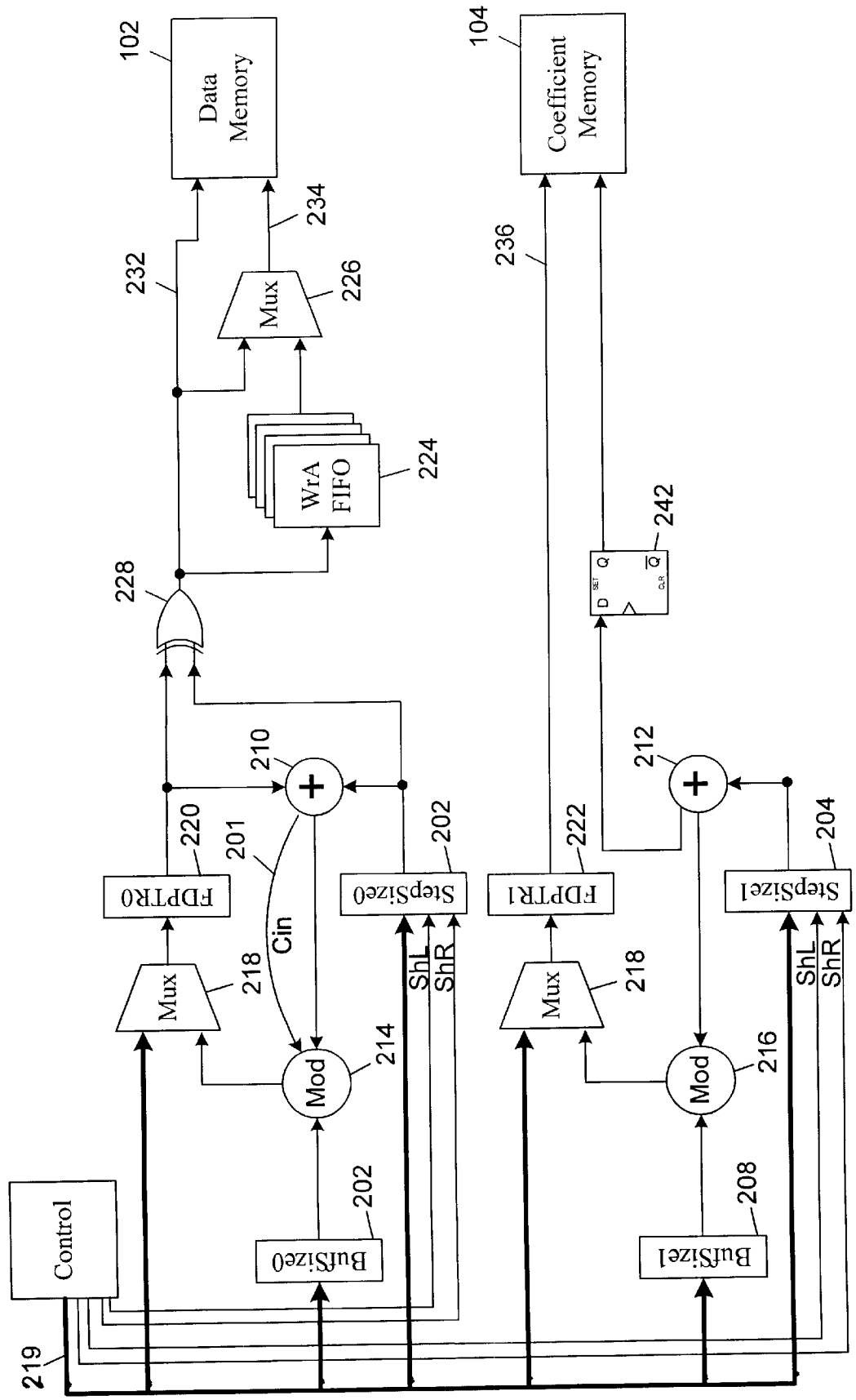
FIG. 5 is a block diagram illustrating the circuitry for controlling the addressing of a data memory and a coefficient memory, in accordance with one embodiment of the present invention.

In accordance with one aspect of the present invention, a circuit 200 has been developed to efficiently manage the addressing for the data memory 102. Reference is now made to FIG. 5, which is a block diagram that illustrates this circuitry. As described above, the address circuitry 200 controls the addressing of the data memory 102 so that interim data values are written back to locations such that interim data values overwrite previously stored data values, to make efficient use of a very small amount of memory in carrying out the complex FFT computation.

Significantly, the address circuitry 200 does not require the use or utilization of a loop control variable. Instead, it has been implemented utilizing only shift, add, and modulo operations. As illustrated, the circuitry primarily comprises a first shift register 202 and second shift register 204, which contain step sizes for the complex butterfly operation. Specifically, the shift registers 202 and 204 indicate the step size (from top to bottom) between successive complex butterflies. For example, and again referring to FIG. 4, during the second stage of computations the step size would be four, while the step size for the third stage 176 would be eight.

Buffer size registers 206 and 208 are also illustrated. In addition, the address generation circuitry includes adders 210 and 212, and modulo adders 214 and 216. Multiplexers 218 and 220 are configured to controllably select between the value on a bus 219 and the output of the modulo adders 214 and 216, respectively. Additional registers 220 and 222 are also illustrated and configured to receive the output of the multiplexers 218 and 220, respectively. In addition, a write address FIFO 224 (four values deep) is illustrated as being interposed between one input of a multiplexer 226 and an exclusive-OR operation 228.

In operation, the read address for data memory 102 and write address for data memory 102 are provided on signal lines 232 and 234. As will be further appreciated from the description that follows, the write FIFO 224 stores each address that is initially output from the exclusive-OR operation 228 onto the read address 232. These same read addresses are then later used in the write-back operation, which allows interim computed values to be written back to the data memory 102 over values previously stored. To illustrate, and returning briefly to the table of FIG. 6, it is observed that in the first clock cycle the data value B0 is read. In the fourth clock cycle the data value of A0 is read. In the fifth clock cycle, the data value B1 is read, and in the eighth clock cycle the data value of A1 is read. In clock cycles 10 and 11, data values D0 and C0 are written. The addresses controlling the write operations will be the first two addresses from the read operations. Therefore, the address for the write operation of the tenth clock cycle will be the same address as was used for data memory 102 in connection with the read operation of the first cycle. As should be appreciated by referencing the complex butterfly of FIG. 1A, the output data value D is along the same horizontal path as the input B, and therefore that interim value will overwrite the value B (which was read in clock cycle 1). Likewise, the second write will write the output value C over top of the input value A. It can be appreciated from a continued view of Table 1, that subsequent reads and writes occur in pairs. That is, for every two read operations there are two write operation. Thus, once the four deep write FIFO 224 has been filed, as data is read in, then data is written out at the same pace.

One other point to be made at this time with regard to the address generation circuitry 200, after each round of computation through all blocks in a given stage, a carry bit 201 is generated at adder 210. This bit is added to the pointer 220 for the next round of computations. For example, consider the computations of stage two 174 (referring to FIG. 4). The step size (as stored in shift register 202) is four. Adder 210 would initially point to the address for the interim value 182. It would then be increased by four locations for each of the subsequent butterfly computations, until reaching the interim value at 184. Without the carry bit 201, the modulo operation 214 would point the address at register 220 back to the interim value 182. However, the carry bit adds to the modulo operation 214, so that the register value 220 points to the next location, or interim value 186.

As illustrated, except for the exclusive-OR operation 228, the write FIFO 224, and multiplexer 226, the remaining circuitry within the address generation circuitry 200 is substantially duplicated. The circuitry near the top portion of the diagram generates the read addresses (on line 232) and the write addresses (on line 234) for the data memory 102. The circuitry of the bottom portion of FIG. 5 generates the address (on line 236) for the coefficient memory 104.

In accordance with one embodiment of the address generation circuitry 200, the size of the coefficient memory 104 may be reduced by translating the coefficient across an axis or boundary. Flip flop 242 may be used to facilitate this operation. As is known, the coefficient values stored in the coefficient memory represent points taken along the unity circle. As such, they be readily translated across an axis or boundary. In this regard, the output of flip flop 242 may be used to specify the output from FDRAM1 as (Sin/Cos) or (-Cos/Sin), as the value specified by the pointer 222 crosses the boundary.

To help illustrate the operation of the address generation circuitry 200, the following segment of pseudo-code is provided. The number of cycles required for computing each stage of an N point complex FFT is 2*N+7. Further, assume that 256 complex samples are stored in bit reverse order in the data memory 102 and 128 complex twiddle factors are stored in increasing order in the coefficient memory 104. Some special start up control circuit (not shown) may be provided to control the write back operation at the very beginning of the program. That is, the write back operation may be delayed by two loops at the beginning of the inner loop.

```
FDP_FFT_128:
   FdPt0=0;
   FdPtr1=0;
   BufSize0=256;
   BufSize1=128;
   StepSize0=1;
   StepSize1=128;
   X=*FdPtr0++, Y=*FdPtr1++, WrA_FIFO=FdPtr0;
     FdPtr0; loop1=8{
   Loop 2=128{
     ACC=Br*Wr, DACC=ACC, Reg=Ar+DACC,
        FIFOr=Reg, *WrA_FIFO=WR (FIFOr, FIFOi);
     ACC=Bi*Wi, Reg=Ai-DACC, FIFOr=Reg,
        *WrA_FIFO=WR (Rififo, FIFOi);
     ACC=Br*Wi, DACC=ACC, RO=Ai+DACC,
        FIFOi=Reg,
        V=*FdPtr0++, WrA_FIFO=FdPtr0;
     ACC=Bi*Wr, Reg=Ar-DACC, FIFOi=Reg,
        Y=*FdPtr1++,
        X=*FdPtr0++, WrA_FIFO=FdPtr0);
     StepSize0<<1, StepSize1>>1};
   DACC=ACC, Reg=Ar+DACC, FIFOr=Reg, *WrA_
     FIFO=(FIFOr, FIFOi);
   Reg=Ai-DACC, FIFOr=Reg, *WrA_FIFO=(FIFOr,
     FIFOi);
   Reg=Ai+DACC, FIFOi=Reg;
   FIFOi=Reg, *WrA_FIFO=(FIFOr, FIFOi);
   *WrA_FIFO=(FIFOr, FIFOi);
```

For consistency, the variable names used in the segment of pseudo-code above match the names shown in FIGS. 3 and 5. In the inner loop of the, each statement beginning with "ACC= . . . " represents actions taken in a separate clock cycle. Thus, there are four clock cycles in the inner loop.

In summary, it should be appreciated that the circuit illustrated in FIG. 5 is an efficient and effective mechanism for generating the addresses for both the data memory 102 and the coefficient memory 104. The write address FIFO (WrAFIFO) 224 provides an efficient mechanism for writing interim data values over previously stored (and retrieved values).

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A circuit for calculating a fast Fourier transform (FFT) of a plurality of data values comprising:

a data memory for storing data values;

a coefficient memory for storing coefficient values;

a multiplier disposed to receive data from both the data memory and the coefficient memory, the multiplier being configured to multiply values retrieved from the data memory and the coefficient memory;

an adder configured to add a value output from the multiplier with another value that is selected by a first multiplexer, wherein the another value selected by the first multiplexer includes one selected from the group consisting of: a value from the data memory, zero, a value output from an accumulator that receives the output of the adder, and a value output from a delayed accumulator that receives the output from the accumulator; and an arithmetic logic unit (ALU) configured to add a value retrieved from the data memory with another value that is selected by a second multiplexer.

2. A circuit for calculating a fast Fourier transform (FFT) of a plurality of data values comprising:

a data memory for storing data values;

a coefficient memory for storing coefficient values;

a multiplier disposed to receive data from both the data memory and the coefficient memory, the multiplier being configured to multiply values retrieved from the data memory and the coefficient memory;

an adder configured to add a value output from the multiplier with another value that is selected by a first multiplexer; and an arithmetic logic unit (ALU) configured to add a value retrieved from the data memory with another value that is selected by a second multiplexer, wherein the another value selected by the second multiplexer includes one selected from the group consisting of: a value from the data memory, zero, a value output from an accumulator that receives the output of the adder, and a value output from a delayed accumulator that receives the output from the accumulator.

* * * * *